(12) United States Patent
Pock (10) Patent No.: US 9,143,661 B2
(45) Date of Patent: Sep. 22, 2015

(54) BALANCED MODULAR CAMERA MOUNT APPARATUS AND METHOD OF USE

(71) Applicant: Leslie A. Pock, Lewisville, TX (US)

(72) Inventor: Leslie A. Pock, Lewisville, TX (US)

( * ) Notice: Subject to any disclaimer, the term of this patent is extended or adjusted under 35 U.S.C. 154(b) by 0 days.

(21) Appl. No.: 13/952,718

(22) Filed: Jul. 29, 2013

(65) Prior Publication Data

US 2015/0029391 A1    Jan. 29, 2015

(51) Int. Cl.
  *A45F 5/00* (2006.01)
  *H04N 5/225* (2006.01)

(52) U.S. Cl.
  CPC ............... *H04N 5/2251* (2013.01); *A45F 5/00* (2013.01); *A45F 2200/0533* (2013.01)

(58) Field of Classification Search
  USPC ............................................. 396/420
  See application file for complete search history.

(56) References Cited

U.S. PATENT DOCUMENTS

| | | | |
|---|---|---|---|
| 3,767,095 A | 10/1973 | Jones | |
| 3,900,140 A | 8/1975 | Kelso et al. | |
| 4,037,763 A | 7/1977 | Turchen | |
| 4,091,975 A | 5/1978 | Russell, Jr. | |
| 4,244,500 A | 1/1981 | Fournier | |
| 4,668,992 A | 5/1987 | Bachmann et al. | |
| D302,171 S | 7/1989 | Assel et al. | |
| 4,946,272 A | 8/1990 | Brown | |
| 4,963,904 A | 10/1990 | Lee | |
| 5,294,947 A | 3/1994 | Harrington | |
| 5,397,041 A | 3/1995 | Bruseker | |
| 5,513,784 A | 5/1996 | Pretorius | |
| 5,940,644 A | 8/1999 | Putora | |
| 6,056,449 A | 5/2000 | Hart | |
| 6,188,849 B1* | 2/2001 | Staicouras | 396/421 |
| 6,641,010 B2 | 11/2003 | Greene | |
| 6,929,409 B2 | 8/2005 | DeSorbo et al. | |
| 7,854,556 B2* | 12/2010 | Wood | 396/428 |
| 7,922,401 B2 | 4/2011 | McKay | |
| 8,128,295 B2 | 3/2012 | Pizzo et al. | |
| 8,831,415 B2* | 9/2014 | Greenthal | 396/12 |
| 2005/0201744 A1* | 9/2005 | DeSorbo et al. | 396/419 |
| 2010/0254696 A1* | 10/2010 | McKay | 396/420 |
| 2012/0328279 A1 | 12/2012 | Raizman | |
| 2014/0063337 A1* | 3/2014 | Sparidaens et al. | 348/376 |

FOREIGN PATENT DOCUMENTS

WO    97/39276    10/1997

\* cited by examiner

*Primary Examiner* — W B Perkey
*Assistant Examiner* — Linda B Smith
(74) *Attorney, Agent, or Firm* — Schultz & Associates, P.C.

(57) ABSTRACT

A balanced, modular camera mounting apparatus providing near hands free support and positioning of a mounted camera with infinite adjustment capability. The apparatus is comprised of a shoulder brace, at least one intermediate assembly plate, a camera mount plate, and a weight/accessory box. The shoulder brace includes curvature both longitudinally and laterally to ergonomically conform to the shoulder of the user. The rear end of the shoulder brace can be straight or curved and also includes a slot to adjustably connect the weight/accessory box. The shoulder brace further includes nonslip padding. Intermediate assembly plates vary in shape and size to allow for myriad adjustments providing balance and positioning according to a desired use. The camera mount plate is attached to an intermediate assembly plate. The weight/accessory box may contain extra assembly plates, camera equipment, or bagged weights as a counterbalance. Components are releasably attached to each other with hand-tightened thumbscrews.

12 Claims, 13 Drawing Sheets

BALANCED MODULAR CAMERA MOUNT APPARATUS AND METHOD OF USE

FIELD OF INVENTION

This disclosure relates to the field of video camera mounts. More particularly this disclosure relates to a balanced, portable, modular camera mounting apparatus capable of permitting near "hands-free" operation.

BACKGROUND OF THE INVENTION

Unlike small consumer palmcorder video cameras, professional rear-eyepiece video cameras can be larger, bulkier, and typically include numerous heavy accessories. Due to the nature of the rear-viewfinder design, the camera is essentially positioned in front of the face of the operator rather than on the shoulder. Hence, they are cumbersome to carry and operate and they tend to feel progressively heavier during prolonged use. Many rear-viewfinder cameras are fitted with a handle or hand strap to assist with the positioning of the camera, but even with a built in handle, the operator must use both hands to properly align the camera and steady it while operating various controls. As a result, fatigue is a problem for the operator during prolonged use.

It is therefore desirable to provide support for the camera and accessory equipment in such a way as to enable the operator to have freedom of movement and lessen fatigue resulting from holding the camera in one position for extended periods of time and simultaneously free the operator's hands for adjustment of the camera's controls and features.

U.S. Pat. No. 6,929,409 to DeSorbo, et al. discloses a shoulder mounted camera support. The device is comprised of modular units having a front and a rear portion stabilized on the shoulder of the operator using a battery as a counterweight. A pair of pivot knuckles connects the front and rear portions. The front portion includes a clutch operated slidable breast plate which rests on the operator's chest during use for assistance with stability. A horizontal supporting shaft extends from the front portion for slidable attachment of a camera shoe. This method of counterbalance creates significant limitations. The system does not allow balance of large cameras in multiple positions without the use of the operator's hands. Additionally, adjustments of camera position are limited.

U.S. Pat. No. 6,641,010 to Greene discloses a shoulder platform for mounting a camera. The device is comprised of a curved frame having a padded shoulder mount, a padded chest plate, and a padded back support. A camera mount is attached to the frame and is comprised of a standard quick release plate and gimbal block for adjusting the camera angle in multiple directions. A storage compartment is mounted to the back of the frame. However, the curved frame limits the adjustment capability of the gimbal block. Further, the device offers little to no counterbalance.

U.S. Pat. No. 6,056,449 to Hart discloses a frame assembly for supporting a camera. The device comprises a rigid frame having a front and a rear. Two shoulder rests are connected to the frame positioned between the front and the rear. A pair of hand grips is provided. A camera mount for releasably holding a video camera is provided. An adjustable counterweight is connected to the rear of the frame for balancing the camera on the shoulders of the operator. The frame assembly requires both shoulders of the operator and therefore can be cumbersome.

U.S. Pat. No. 5,940,644 to Putora discloses a balancing apparatus for stabilizing a camera. An elongated balance arm is provided. A pivotal support is slidably connected to the balance arm and includes a shoulder rest. The pivotal support provides a fulcrum point. A camera mount is coupled to the front end and a counterweight is coupled to the back end. The counterweight and camera mount are arranged such that when the camera is counterbalanced, the apparatus has a center of gravity directly below the fulcrum point. However, the camera mount provides limited adjustability, which limits the users which can use the device.

Therefore there is a need for a lightweight, portable camera support capable of providing near limitless adjustability for proper camera positioning while obtaining full hands-free balance.

SUMMARY OF INVENTION

The device disclosed is a camera mounting apparatus intended to be positioned on one shoulder of a camera operator. The device, when adjusted and balanced, provides stable hands free camera operation and reduces the fatigue associated with holding a camera during lengthy use. The device is intended for both novice and professional operators to support cameras of different sizes ranging from small digital cameras to large video and SLR cameras.

In summary, the device is comprised of a shoulder brace, at least one intermediate assembly plate, a camera mount plate, and a weight/accessory box acting as a counterbalance. The shoulder brace has a longitudinally oriented curvature and a slightly raised inside edge to ergonomically conform to the shoulder of the user. The shoulder brace further includes padding. The front end of the shoulder brace is typically straight and includes a slot to slidably mount an intermediate assembly plate. Intermediate assembly plates are provided in a variety of shapes and sizes depending on desired use. Each intermediate assembly plate also includes mounting slots which allow for a myriad of custom lengths and positions to provide balance and proper positioning. The camera mount plate is slidably attached to an intermediate assembly plate. The rear end of the shoulder brace can be straight, angled, or curved and also includes a slot to adjustably connect the weight/accessory box. The weight/accessory box may contain extra assembly plates, camera or audio accessories, extra batteries, and/or bagged weights as a counterbalance. All components are releasably attached to each other with hand-tightened thumbscrews or other quick-lock hardware. Adjustments of the relative positions between two adjoining pieces are widely variable given each piece incorporates a slot for "front-to-back" and "side-to-side" movement in addition to the thumbscrews providing a pivot point for variable rotation.

In an alternate embodiment, a chest plate can be pivotally hinged to the front of the shoulder brace. The hinged chest plate can accommodate various body shapes and operator preferences while further assisting with steadying of the camera. The chest plate includes a collection of horizontal slots for attachment of a hinged camera mount plate. The hinged camera mount plate may include a tensioned pivot point for additional camera tilt positioning relative to the chest plate providing different viewing angles.

In an alternate embodiment, a handle is mounted to the upper surface of the shoulder brace. The handle is longitudinally oriented and is centered over the lateral edges of the shoulder brace. The handle may be used for transporting the apparatus while the camera is attached or for providing a low angle vantage point at any height between the ground and the operator's shoulder, while maintaining level balance of the camera during movement.

In use, a camera is mounted to the camera mount plate and the device balances on the shoulder of the operator in the operator's preferred position for comfortable support and operation of the camera. Standard camera operating adjustments, such as focus, can be made without disturbing the balance of the device. An operator can set the camera to virtually any position desired. The curvature of the shoulder brace creates a fulcrum point such that near perfect weight equalization is achieved resulting in lateral pitch balance as well as upward and downward tilt balance. The result is elimination of need for assistance from the operator's hands or arms in supporting the camera or its position, even during moderate movement by the operator, including tilting to aim the camera in any direction. The components are releasably assembled together with hand-tightened thumbscrews. The device provides for near infinite adjustment capability of the camera position relative to the face and eye of the operator. The relative position of the weight box is further adjustable to accommodate a wide variety of camera sizes and weights. The camera can be moved forward or backward on the camera mount plate and the camera angle can be pivoted left or right. The camera mount plate can be raised or lowered and pitched rotationally clockwise or counterclockwise.

BRIEF DESCRIPTION OF DRAWINGS

Reference will now be made to the drawings, wherein like parts are designated by like numerals, and wherein.

DETAILED DESCRIPTION OF PREFERRED EMBODIMENTS

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Figure 1:
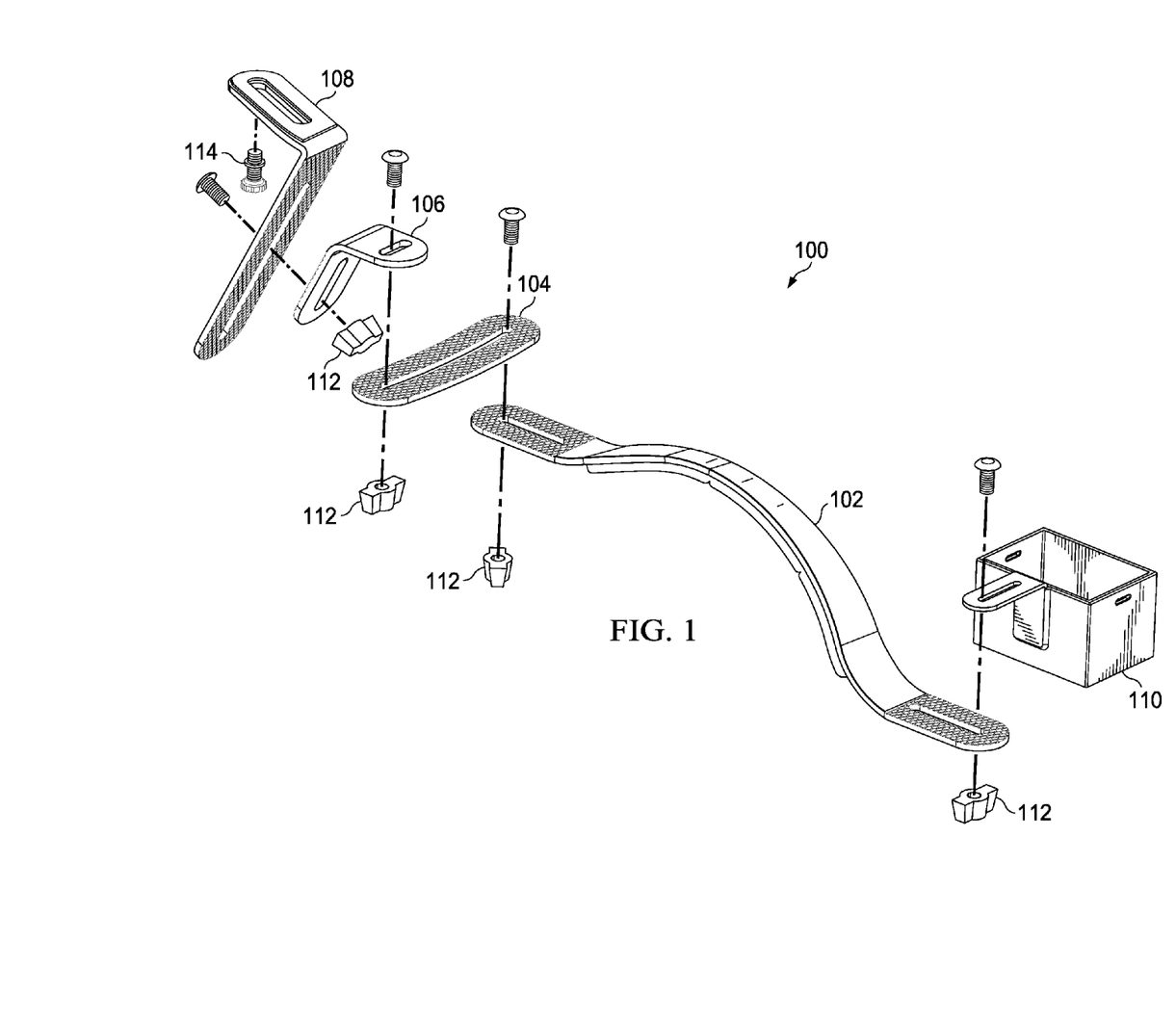
FIG. 1 is an exploded isometric view of a preferred embodiment.

Referring to FIG. 1, the components of camera mount apparatus 100 include shoulder brace 102, flat intermediate plate 104, angled intermediate plate 106, camera mount plate 108, and counterbalance box 110. Each component has a variety of slots for connection to adjacent components. All slots are generally laterally centered on their respective components and are approximately ¼ inch to 7/16 inch wide. Edges of all slots may be recessed or beveled for countersinking of fastening hardware. Releasable thumbscrews 112, cooperate with bolts inserted through the slots to pivotally connect components together. Other fastening hardware can be used. Threaded mounting pin 114 extends through a slot in camera mount plate 108 for attachment to a camera body. In a preferred embodiment, the components of camera mount apparatus are stamped and formed from ⅛ inch to ¼ inch flat bend-resistant aluminum sheet. However, the components are desired to be strong and lightweight and could be manufactured from other metals such as steel and titanium, synthetic or polycarbonate materials such as carbon fiber or Kevlar®, durable plastic, or any combination of these. Camera mount apparatus 100 is illustrated and described for right handed operation of cameras with rear viewfiders, left side view finders, or left side LCD monitors, as these cameras are most popular. It is understood that the device could be manufactured to be left-handed by reversing the shapes of the parts and their locations right to left.

Referring to FIGS. 2A-2D, shoulder brace 102 is shown. Shoulder brace 102 has a rear section 202 integrally formed with an arcuate section 204 and a front section 206. Rear section 202 includes slot 210 generally parallel with the central axis of shoulder brace 102. Rear section 202 includes knurled surface 222. Rear section 202 extends straight from arcuate section 204. In an alternate preferred embodiment, rear section 202 extends outwardly from arcuate section 204 at an angle of approximately 10° to 20°. Arcuate section 204 extends from rear section 202 to front section 206 in a generally curved shape. Front section 206 includes slot 212 generally parallel with the central axis of shoulder brace 102. Front section 206 includes knurled surface 226. In a preferred embodiment, the overall length of shoulder brace 102 is approximately 15 to 17 inches where rear section 202 has a length of approximately 2 to 4 inches, arcuate section 204 has a radius of curvature of approximately 5 to 11 inches, front section 206 has a length of approximately 3 to 5 inches, slot 210 has a length of approximately 1 to 2 inches, slot 212 has a length of approximately 2 to 3 inches, and rise "X" is approximately 3 inches. Arcuate section 204 has a laterally angled edge as indicated by angle "Θ" where lateral edge 214 is raised as compared to lateral edge 216. In the preferred embodiment, angle "Θ" at its maximum, ranges between approximately 10° and 20°. The difference in relative positions of the lateral edges provides a shape which ergonomically conforms to the shape of an operator's shoulder. Angle "Θ" is generally 0° where rear section 202 adjoins arcuate section 204 and also generally 0° where arcuate section 204 adjoins front section 206. Angle "Θ" gradually increases from 0° to between 10° and 20° and decreases back to 0° through the length of arcuate section 204 reaching its maximum angle approximately at the midpoint. Padding 208 is attached to the underside of arcuate section 204. Padding 208 is generally polyurethane foam or rubber padding and is affixed to arcuate section 204 through common in the art methods such as adhesives or screws.

Figure 2A:
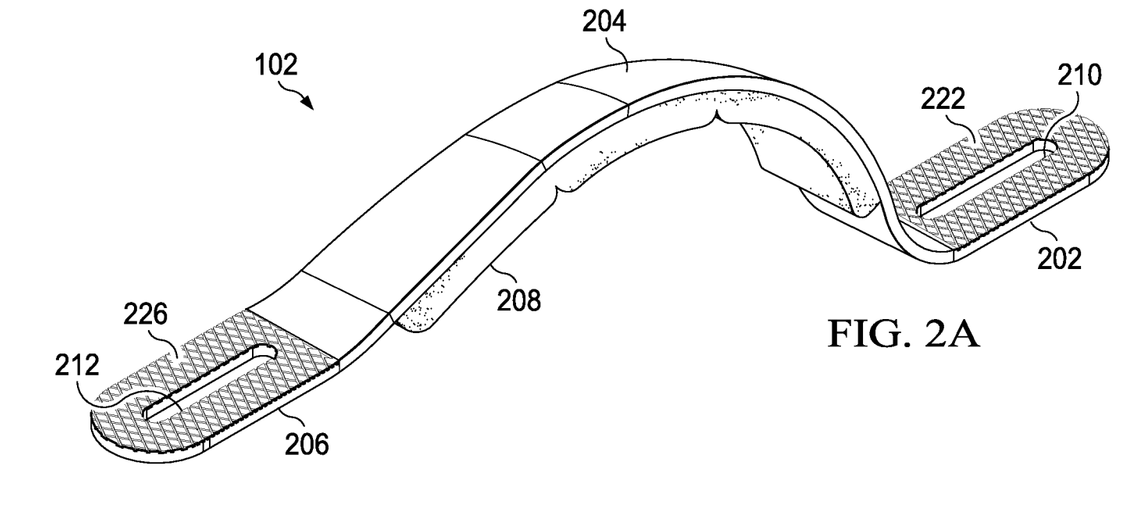
FIG. 2A is an isometric view of a shoulder brace of a preferred embodiment.
Figure 2B:
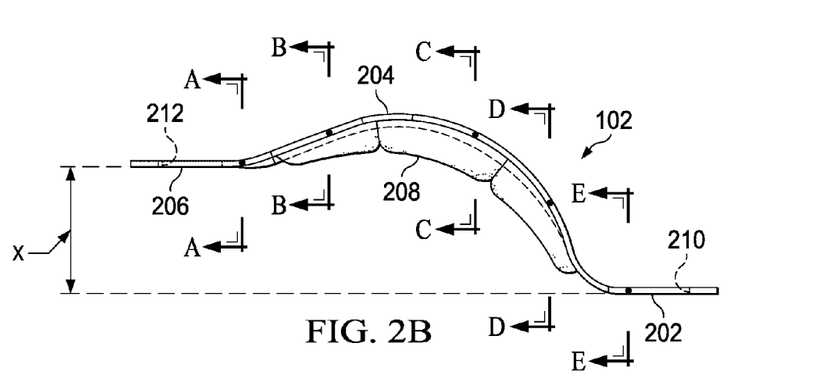
FIG. 2B is an elevation view of a shoulder brace of a preferred embodiment.
Figure 2C:
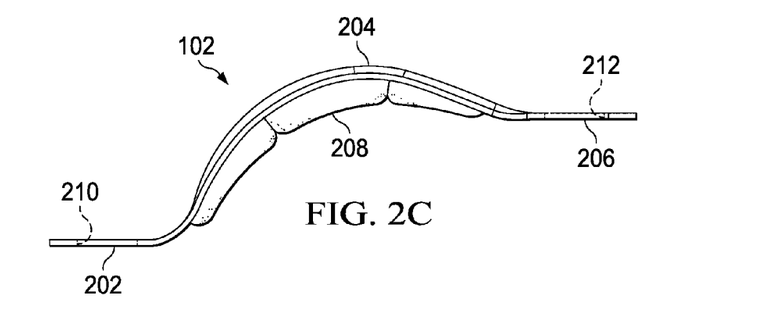
FIG. 2C is an elevation view of a shoulder brace of a preferred embodiment.
Figure 2D:
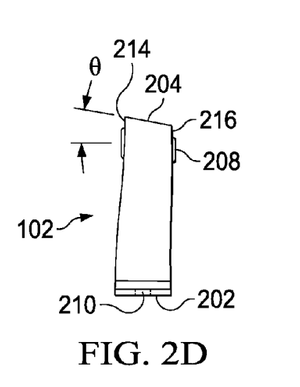
FIG. 2D is an elevation view of a shoulder brace of a preferred embodiment.
Figure 2E:
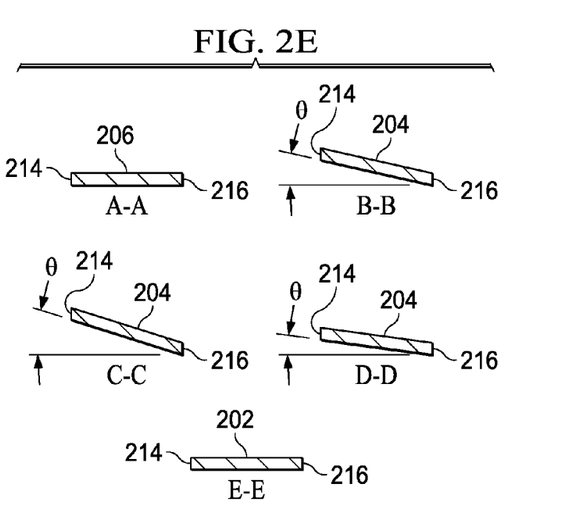
FIG. 2E is a series of cross-sectional elevation views along lines A-A, B-B, C-C, D-D, and E-E from FIG. 2B of a shoulder brace of a preferred embodiment.

Referring to FIG. 2E, cross-sections A through E of shoulder brace 102 are shown. FIG. 2E illustrates the gradual change of angle "Θ" through the length of arcuate section 204. At point A, front section 206 transitions to arcuate section 204 and angle "Θ" is generally 0° as shown by cross-section A-A. Point B is approximately 2 inches from point A. In the preferred embodiment, angle "Θ" at cross-section B-B is approximately 8° but can generally range between approximately 4° and 12°. Point C is approximately 2 inches from point B. In the preferred embodiment, angle "Θ" at cross-section C-C is approximately 10° but can generally range between approximately 6° and 14°. Point D is approximately 2 inches from point C. In the preferred embodiment, angle "Θ" at cross-section D-D is approximately 6° but can generally range between approximately 2° and 10°. At point E, arcuate section 204 transitions to rear section 202 and angle "Θ" is generally 0° as shown by cross-section E-E.

Figures 3, 4:
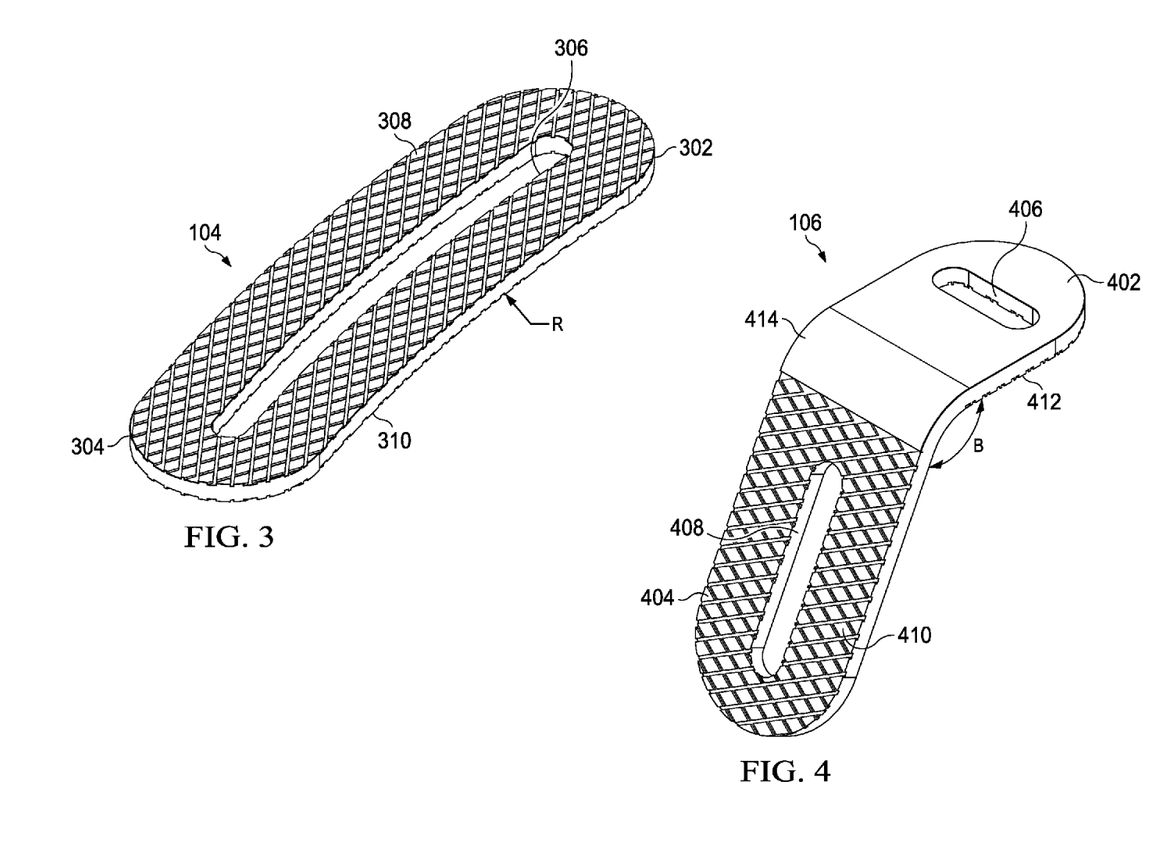
FIG. 3 is an isometric view of an intermediate plate of a preferred embodiment.
FIG. 4 is an isometric view of an intermediate plate of a preferred embodiment.

Referring to FIG. 3, flat intermediate plate 104 is shown. Flat intermediate plate 104 includes longitudinal slot 306 centered between end 302 and end 304. In the preferred embodiment, flat intermediate plate 104 is approximately 5 to 7 inches in length. Slot 306 extends approximately 4 to 6 inches. Flat intermediate plate 104 includes knurled surface 308 on one side and knurled surface 310 on the opposite side. In the preferred embodiment, flat intermediate plate is arcuate where radius "R" is approximately 15 to 16 inches. In an alternate embodiment, flat intermediate plate 104 and slot 306 are linear.

Referring to FIG. 4, angled intermediate plate 106 is shown. Angled intermediate plate 106 includes end 402 separated from end 404 by bend 414. End 404 is approximately twice as long as end 402. Angle "B" of bend 414 is approximately 120° but can range from approximately 110° to 130°. End 404 extends straight from end 402. In an alternate preferred embodiment, end 404 extends outwardly from end 402 at an angle of approximately 10° and 30°. End 402 includes slot 406. Slot 406 is arranged generally perpendicular to the central axis of flat intermediate plate 106. End 404 includes slot 408 generally parallel with the central axis of flat intermediate plate 106. End 406 includes knurled surface 410 and end 402 includes knurled surface 412.

Figures 5A, 5B:
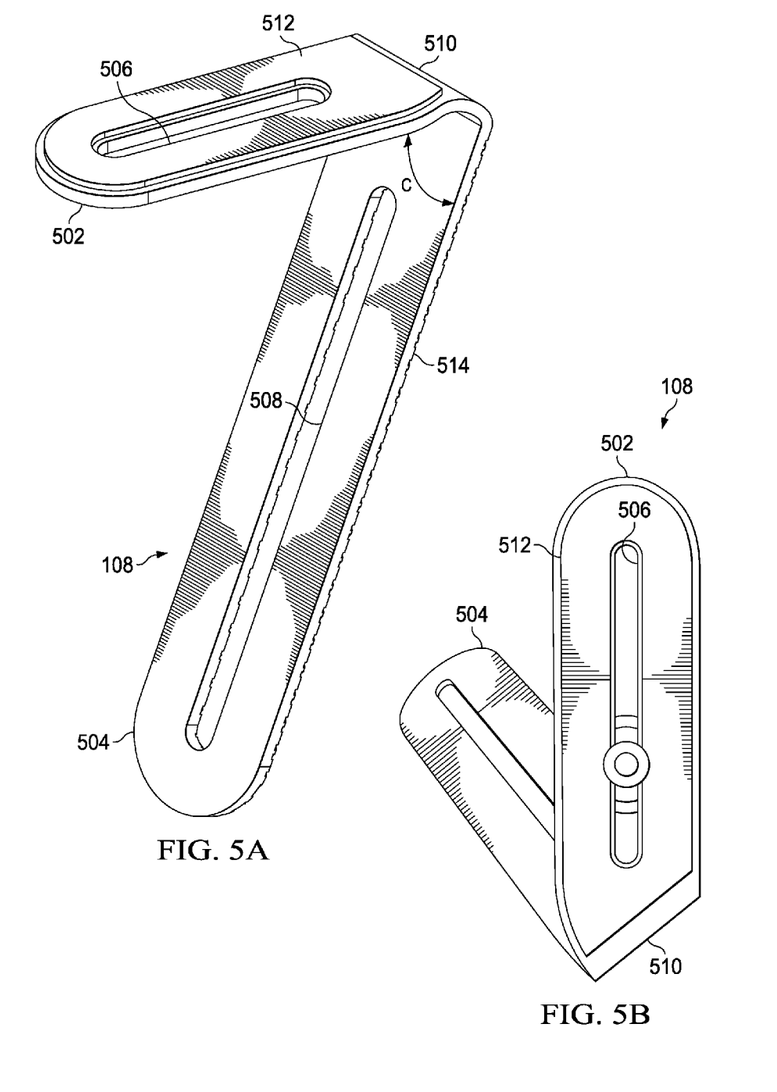
FIG. 5A is an isometric view of a camera mount plate of a preferred embodiment.
FIG. 5B is a top view of a camera mount plate of a preferred embodiment.

Referring to FIGS. 5A and 5B, camera mount plate 108 is shown. Camera mount plate 108 includes end 502 separated from end 504 by bend 510. Angle "C" of bend 510 is approximately 60° but can range from approximately 50° to 70°. Angle "B" of angled intermediate plate 106 and angle "C" of camera mount plate 108 are generally supplementary angles. End 504 extends outwardly from end 502 at an angle of approximately 45° but can range from approximately 35° to 55°. In an alternate embodiment, end 504 extends straight from end 502. End 502 includes slot 506 and end 504 includes slot 508. Both slots 506 and 508 are generally parallel with the central axis of camera mount plate 108. End 502 includes padding 512. In the preferred embodiment, padding 512 is approximately 1/16 inch thick and is manufactured of plastic, rubber or other durable and slip resistant material. Padding 512 is affixed to end 502 with adhesive. In the preferred embodiment, end 502 is shaped as shown but alternate shapes such as oval and circular are available. End 502 is not limited to one slot longitudinally arranged. In an alternate preferred embodiment, end 502 includes a plurality of slots positioned both parallel and perpendicular to the central axis of camera mount plate 108. End 504 includes knurled surface 514.

Figure 6:
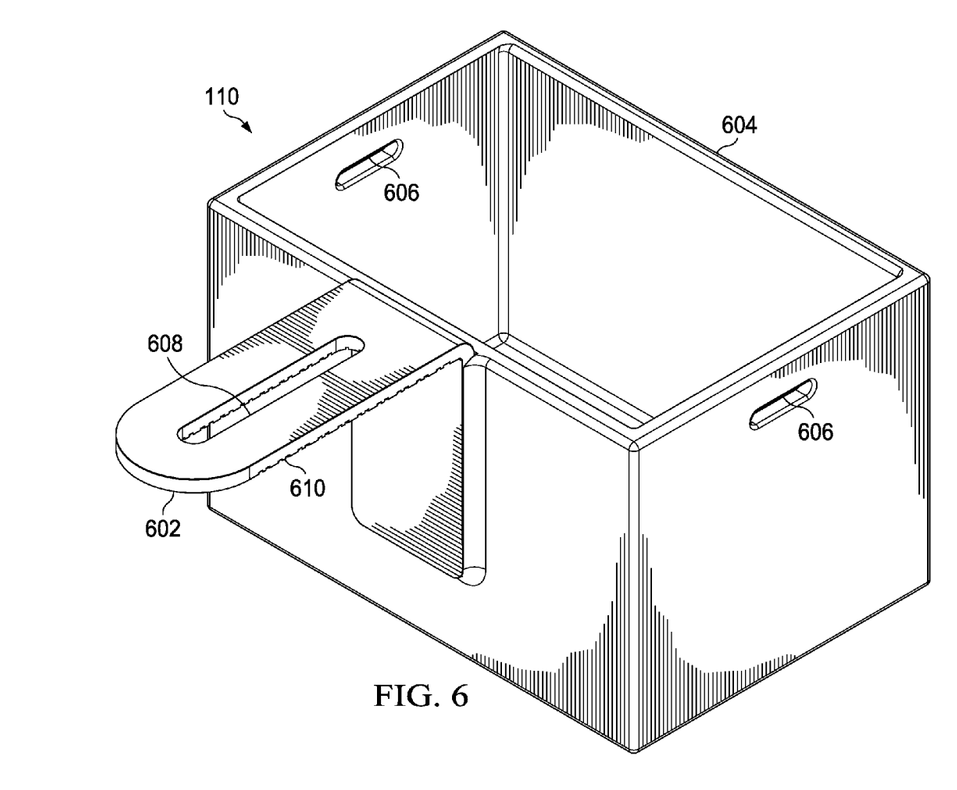
FIG. 6 is an isometric view of a counterbalance box of a preferred embodiment.

Referring to FIG. 6, counterbalance box 110 is shown. Counterbalance box 110 includes arm 602 connected to body 604. Arm 602 includes slot 608 generally parallel with the central axis of arm 602. In the preferred embodiment arm 602 is approximately 4 to 5 inches in length. Arm 602 includes knurled surface 610. Body 604 is generally rectangular with approximate dimensions of 4 by 6 inches and approximately 4 to 7 inches deep. Other polygonal shapes, especially those specifically shaped to contain particular camera accessories, are envisioned. Body 604 further includes slots 606. An optional strap (not shown) can be inserted through slots 606 to secure items within counterbalance box 110.

Figure 7:
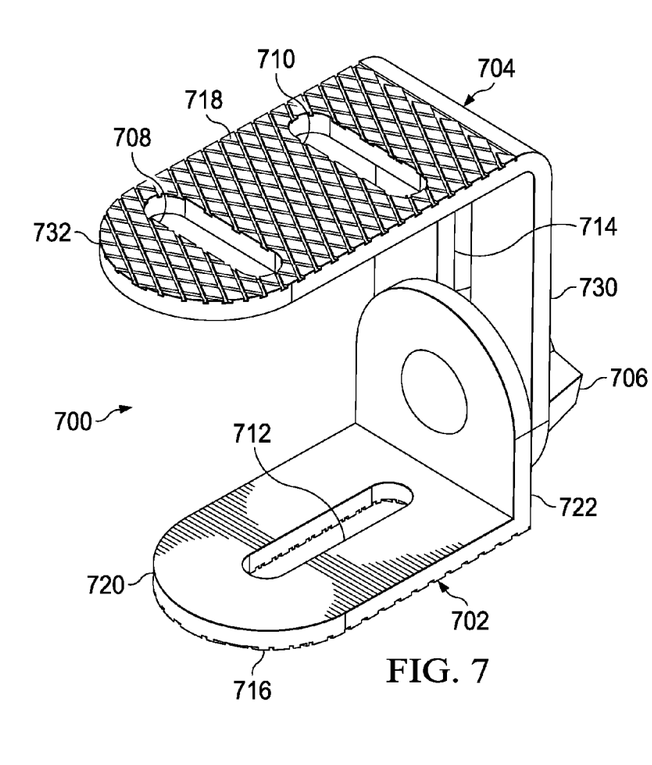
FIG. 7 is an isometric view of a vertical elevator and tilt/pitch accessory of a preferred embodiment.

Referring to FIG. 7, vertical elevator 700 is shown. Vertical elevator 700 is comprised of base 702 pivotally connected to extender 704. Base 702 includes end 720 separated from end 722 by a generally 90° bend. End 720 includes slot 712 arranged generally parallel with the central axis of base 702. End 720 further includes knurled surface 716. Extender 704 includes end 730 separated from end 732 by a generally 90° bend. End 730 includes slot 714. End 732 includes a pair of slots 708 and 710 arranged generally perpendicular to the central axis of extender 704. In an alternate embodiment, ends 720 and 732 are not limited to the illustrated slot configuration. Ends 720 and 732 may include a plurality of slots arranged parallel and/or perpendicular to the central axis of vertical elevator 700. End 732 includes knurled surface 718. Thumbscrew 706 cooperates with a threaded bolt inserted through slot 714 and a hole in end 722 to pivotally connect end 702 to end 704. The threaded bolt provides a pivot axis for base 702 relative to extender 704. Vertical elevator 700 is an optional component used when extra elevation of the camera relative to the operator's eye is required due to varying camera size or for clearance over other components. When in use, typically base 702 is pivotally connected to front section 206 and extender 704 is pivotally connected to flat intermediate plate 104. However, vertical elevator 700 could optionally be pivotally connected to any of the other forward components.

Figure 8:
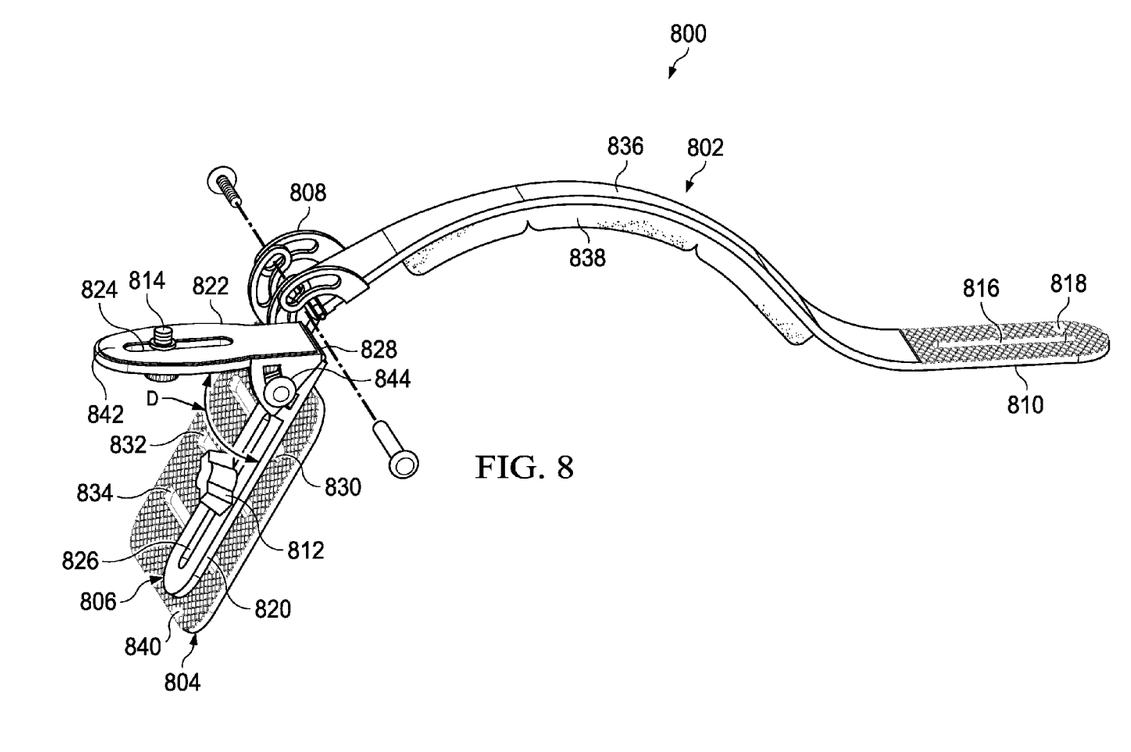
FIG. 8 is an isometric view of a front assembly of a preferred embodiment.

Referring to FIG. 8, an alternate embodiment camera mount apparatus 800 is shown. The components of camera mount apparatus 800 include shoulder brace 802, chest plate 804, and camera mount plate 806. Shoulder brace 802 includes rear section 810. Rear section 810 further includes slot 816 for connection to a counterbalance box. Rear section 810 also includes knurled surface 818. Arcuate section 836 is integrally formed with and extends from rear section 810 in a generally curved shape to conform to the shape of an operator's shoulder. Arcuate section 836 includes padding 838. Shoulder brace 802 is pivotally connected to chest plate 804 with hinge assembly 808. Hinge assembly 808 is capable of being tightened to a fixed position to prevent movement of the position of chest plate 804 relative to shoulder brace 802.

Chest plate 804 is generally rectangular in shape and pivotally connected to shoulder brace 802 in a corner. The right side (as an operator would balance the device on his/her right shoulder) of chest plate 804 is aligned with the shoulder brace 802. Chest plate 804 includes horizontal slots 830, 832, and 834. Chest plate 804 further includes knurled surface 840.

Camera mount plate 806 is comprised of end 820 pivotally attached to end 822 by hinge assembly 844. Hinge assembly 844 allows angle "D" between ends 820 and 822 to be adjusted about pivot point 828 and is capable of being tightened to a fixed position to secure a desired angle between the ends. In the preferred embodiment, angle "D" ranges from 30° to 90°. End 820 includes slot 826. Thumbscrew 812 cooperates with a threaded bolt inserted through slot 826 and one of slots 830, 832, or 834 to adjustably connect camera mount plate 806 to chest plate 804. End 822 includes slot 824. End 822 also includes padding 842. In the preferred embodiment, padding 842 is approximately 1/16 to 1/8 inch thick and is manufactured of a plastic, rubber, or other common in the art slip resistant material and is affixed to end 822 with adhesive. End 822 is paddle shaped as shown but alternate shapes such as oval, circular, or straight will suffice. End 822 is not limited to one slot longitudinally arranged. End 822 may include a plurality of slots positioned both parallel and perpendicular to the central axis of camera mount plate 806. Threaded mounting pin 814 extends through a slot in end 822 for attachment to a camera body. In an alternate embodiment, camera mount plate 806 may be a component of camera mount apparatus 100.

Figure 9:
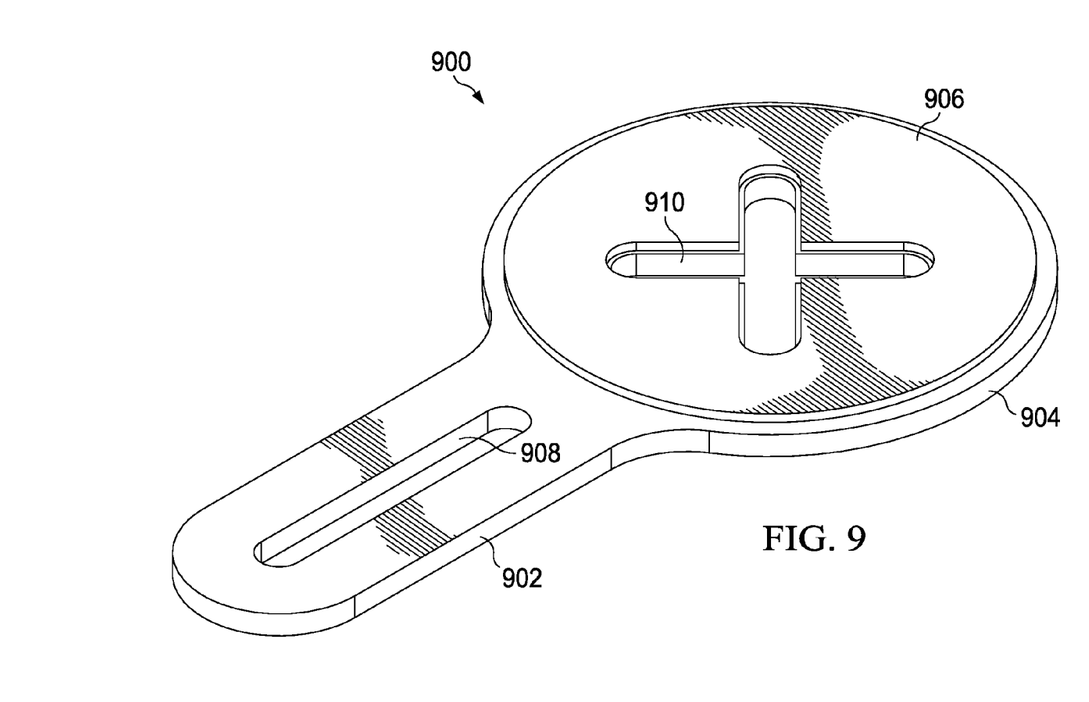
FIG. 9 is an isometric view of an accessory camera mount plate of a preferred embodiment.

Referring to FIG. 9, accessory camera mount plate 900 is shown. Arm section 902 is integrally formed with and extends to mount section 904. Arm section 902 includes slot 908 generally parallel with the central axis of mount plate 900. Mount section 904 is generally circular shaped but could also be oval or polygonal. Mount section 904 includes cross shaped slot 910. Mount section 904 further includes padding 906. Padding 906 is approximately 1/16 inch thick and is manufactured of a plastic, rubber, or other common in the art durable and slip resistant material. Padding 906 is affixed to mount section 904 with adhesive. Camera mount plate 900 is optional and is most particularly useful with cameras that have left side viewfinders or left side LCD monitors where the position of the camera relative to the operator's head is required to be further to the right out over and slightly in front of the operator's shoulder. Accessory camera mount plate 900 can be pivotally connected to end 502 or to end 822. A thumbscrew cooperates with a bolt extending through cross shaped slot 910 and slot 506 and slot 824 respectively. The slots provide "side-to-side" and "front-to-back" adjustment capability while the bolt and thumbscrew provide a pivot axis for rotational adjustment of accessory camera mount plate 900 relative to end 502 or to end 822. Accessory camera mount plate 900 is not limited to the illustrated slot configuration and could include a plurality of slots arranged parallel and/or perpendicular to the central axis of accessory camera mount plate 900.

Figures 10, 11:
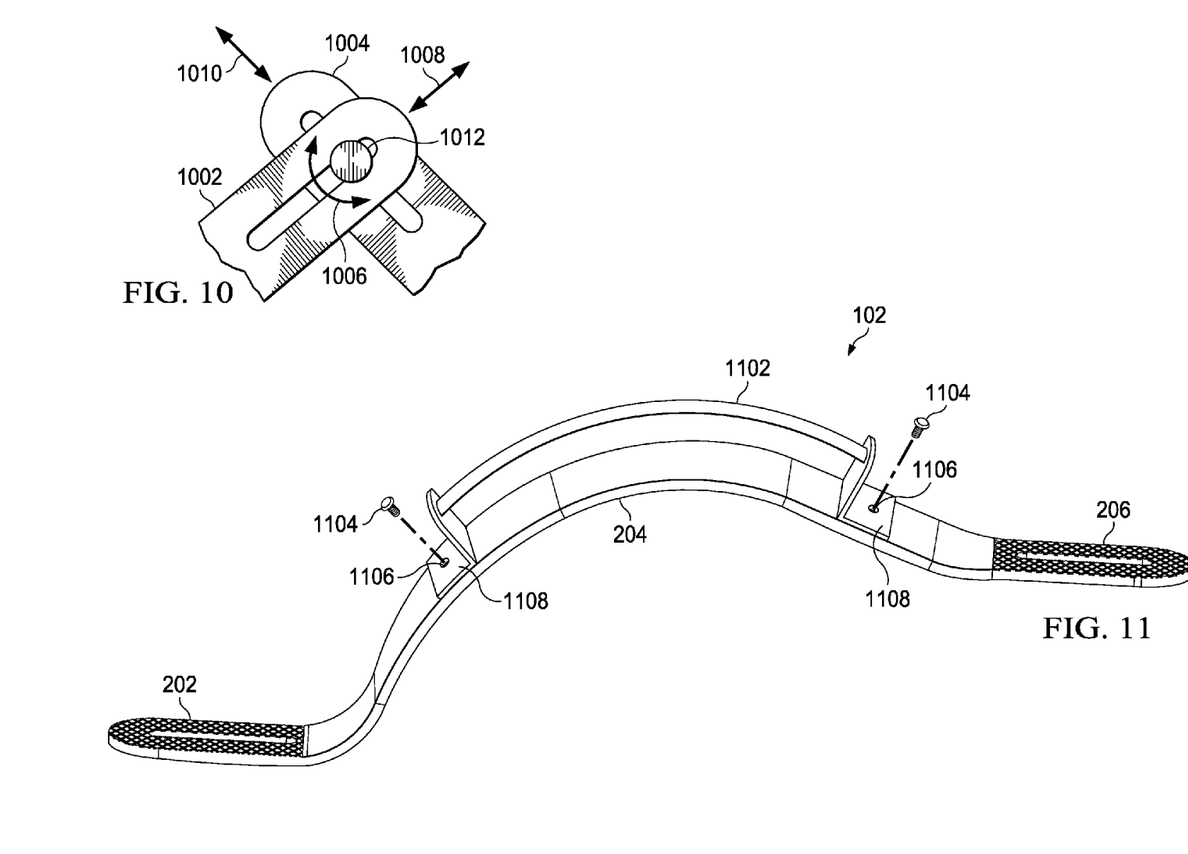
FIG. 10 is a top view of a connection point of a preferred embodiment.
FIG. 11 is an elevation view of a handle of a preferred embodiment.

Referring to FIG. 10, a representative connection point is shown. The intersecting slots of adjacent components 1002 and 1004 combined with a thumbscrew and bolt 1012 allows for quick adjustment at each connection point. At each connection point, the components can be rotated clockwise or counterclockwise in direction 1006 about the thumbscrew/bolt combination. The bolt at each connection point provides a pivot axis relative to the two components connected at that connection point. Additionally, each thumbscrew/bolt combination can slide through the length of each slot of components 1002 and 1004 providing a multitude of adjustment combinations. Component 1002 can move in a "side-to-side" direction 1008 and "front-to-back" direction 1010 relative to component 1004 and vice versa.

Referring to FIG. 11, shoulder brace 102 is shown with attached handle 1102. Handle 1102 generally follows the length and shape of arcuate section 204. Handle 1102 includes mounting brackets 1106 on each end. Brackets 1106 include holes 1108. Bolts 1104 releasably attach handle 1102 to shoulder brace 102. Handle 1102 allows for various forward to back hand positions for balanced carrying when apparatus is not positioned on an operator's shoulder. In an alternate embodiment, handle 1102 is straight. Handle 1102 could also be attached to shoulder brace 802. In an alternate embodiment, handle 1102 can be permanently molded to shoulder brace 102 or shoulder brace 802.

Figure 12A:
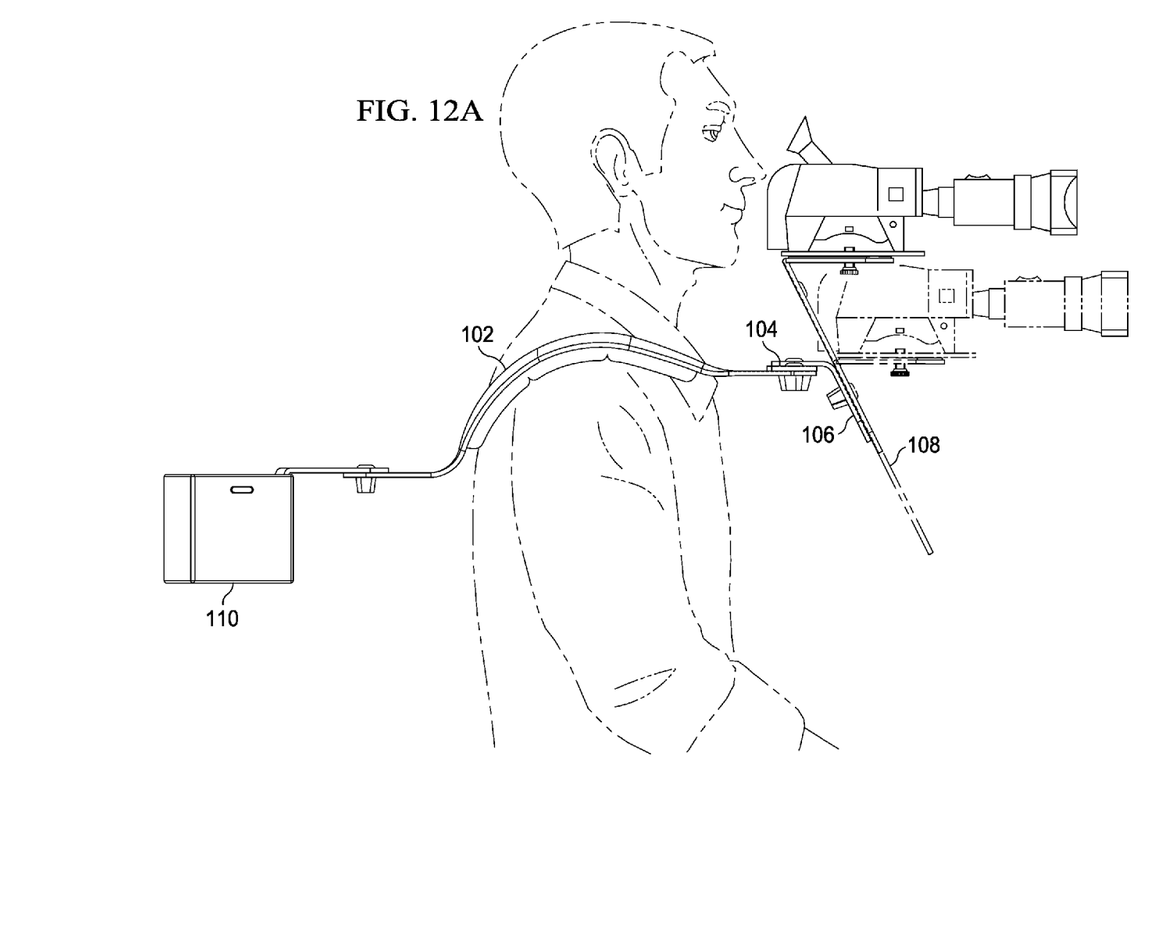
FIG. 12A is an elevation view of a preferred embodiment.
Figure 12B:
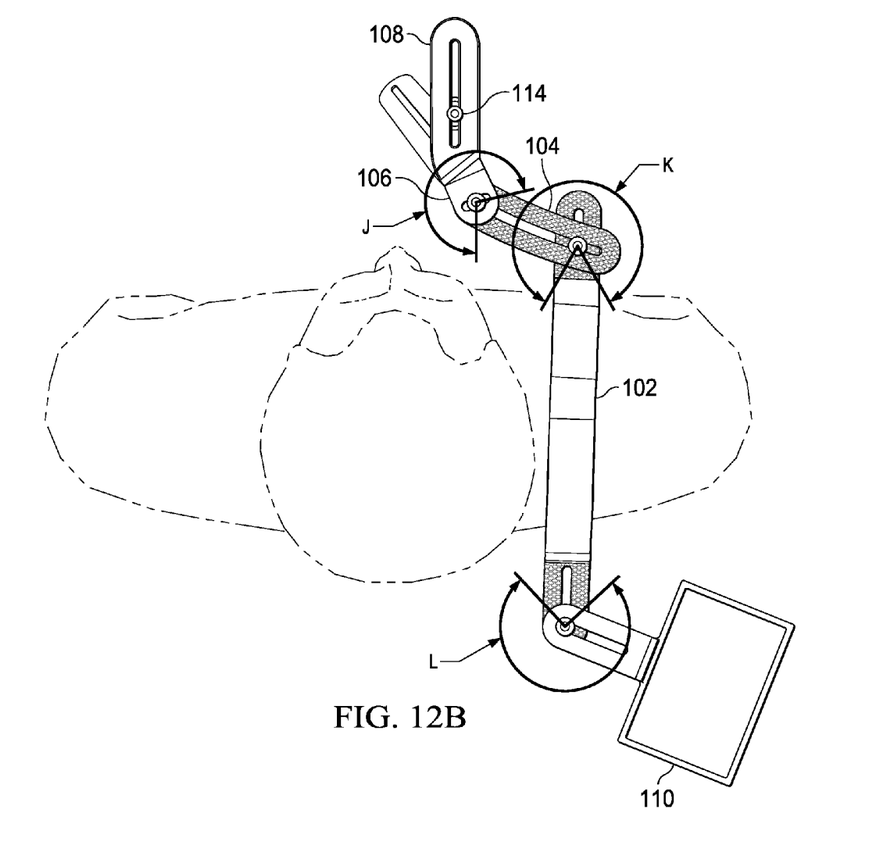
FIG. 12B is a top view of a preferred embodiment.
Figure 12C:
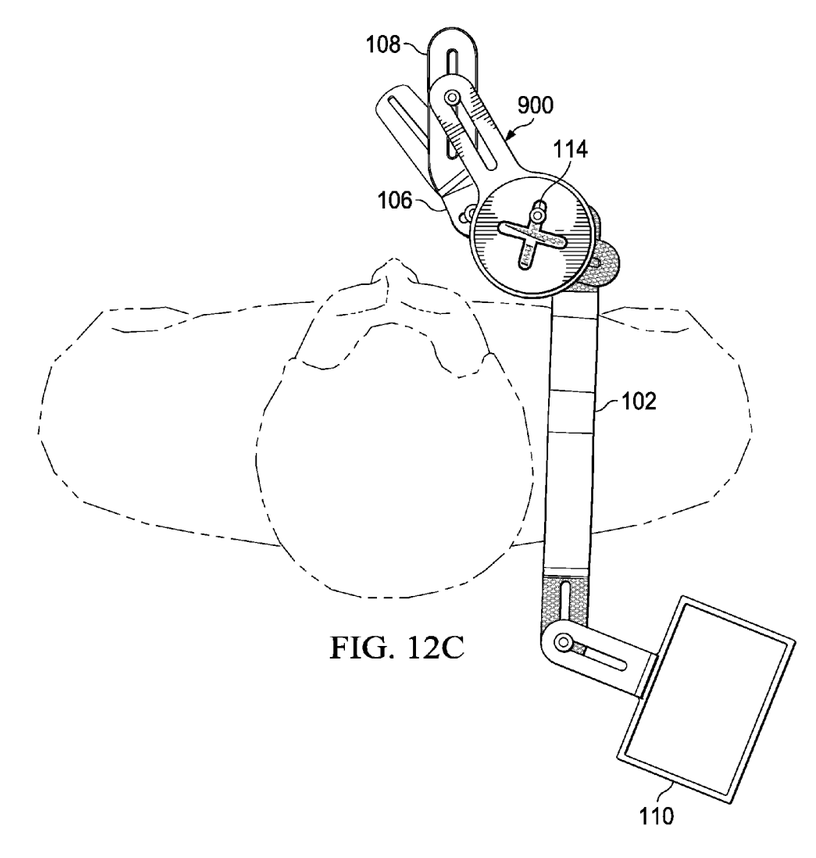
FIG. 12C is a top view of a preferred embodiment with accessory camera mount plate.

In use, the apparatus is assembled and deployed as shown in FIGS. 12A and 12B. A camera is mounted to the camera mount plate via the threaded mounting pin. The pin may slide within slot 506 and the camera can rotate about the pin a full 360° if necessary. In addition to sliding within slots 408 and 508, camera mount plate 108 can pivot relative to angled intermediate plate 106 about the connecting thumbscrew through a range of motion of generally 360°. In addition to sliding laterally within slots 306 and 406, angled intermediate plate 106 can pivot relative to flat intermediate plate 104 about the connecting thumbscrew through range of motion "J" equal to approximately 270°. In addition to sliding laterally within slots 212 and 306, flat intermediate plate 104 can pivot relative to shoulder brace 102 about the connecting thumbscrew through range of motion "K" equal to approximately 300°. In addition to sliding laterally within slots 210 and 608, counterbalance box 110 can pivot relative to shoulder brace 102 about the connecting thumbscrew through a range of motion "L" of approximately 270°. Weights, camera accessories, or additional intermediate plates are placed in the counterbalance box to offset the weight of the camera. Once the device is assembled and balanced at preferred angles and distances, the thumbscrews are tightened by hand and the knurled surfaces engage each other preventing slippage. In an alternate embodiment, any or all knurled surfaces could be replaced with any other securely adherent slip resistance surface common in the art. The apparatus is balanced on the shoulder of the operator. The padding affixed to the shoulder brace provides a comfortable and non-slip engagement between the operator and the apparatus. When properly adjusted and balanced, operator fatigue is minimized as the apparatus provides fully hands free support and stability for the camera even as the operator moves the point of view of the camera. FIG. 12C illustrates an applied usage position of accessory camera plate 900.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

The invention claimed is:

1. A camera mounting apparatus for an operator of a camera, the apparatus comprising:
    an arched shoulder brace adjustably connected to an accessory box at a first connection point, where the shoulder brace further includes an angled edge for conforming to the operator's shoulder;
    a camera mount plate adjustably connected to the shoulder brace at a second connection point, where the first and second connection points provide lateral, longitudinal, and pivotal adjustment capability;
    a first intermediate plate adjustably connected to a front end of the shoulder brace at a third connection point;
    the accessory box adjustably connected to a rear end of the shoulder brace at the first connection point;
    the camera mount plate adjustably connected to the first intermediate plate at the second connection point; and,
    where the third connection point provides lateral, longitudinal, and pivotal adjustment capability.

2. The camera mounting apparatus of claim 1 wherein the angled edge ranges from 0° to 20° through the length of the shoulder brace.

3. The camera mounting apparatus of claim 1 wherein the shoulder brace includes a pad.

4. The camera mounting apparatus of claim 1 further comprising:
- a vertical elevator adjustably connected to the shoulder brace; and
- the camera mount plate adjustably connected to the vertical elevator.

5. The camera mounting apparatus of claim 1 further comprising:
- a camera mount extension adjustably connected to the camera mount plate.

6. A camera mounting apparatus for an operator of a camera, the apparatus comprising:
- an arched shoulder brace adjustable connected to an accessory box at a first connection point, where the shoulder brace further includes an angled edge for conforming to the operator's shoulder;
- a camera mount plate adjustably connected to the shoulder brace at a second connection point, where the first and second connection points provide lateral, longitudinal, and pivotal adjustment capability;
- a first intermediate plate adjustably connected to a front end of the shoulder brace at a third connection point;
- the accessory box adjustably connected to a rear end of the shoulder brace at the first connection point;
- a second intermediate plate adjustably connected to the first intermediate plate at a fourth connection point;
- the camera mount plate adjustably connected to the second intermediate plate at the second connection point; and,
- where the third and fourth connection points provide lateral, longitudinal, and pivotal adjustment capability.

7. A camera mounting apparatus for an operator of a camera, the apparatus comprising:
- an arched shoulder brace adjustably connected to an accessory box at a first connection point, where the shoulder brace further includes an angled edge for conforming to the operator's shoulder;
- a camera mount plate adjustably connected to the shoulder brace at a second connection point, where the first and second connection points provide lateral, longitudinal, and pivotal adjustment capability;
- a first intermediate plate adjustably connected to a front end of the shoulder brace at a third connection point;
- the accessory box adjustably connected to a rear end of the shoulder brace at the first connection point;
- a second intermediate plate comprising a first end and a second end separated by a first angle where the first end is adjustably connected to the first intermediate plate at a fourth connection point;
- the camera mount further comprising an attachment end and a mount end separated by a second angle where the attachment end is adjustably connected to the second end at the second connection point and where the first angle and the second angle are supplementary angles; and,
- where the third and fourth connection points provide lateral, longitudinal, and pivotal adjustment capability.

8. The camera mounting apparatus of claim 7 where the second end extends outwardly from the first end at an angle of approximately 10° to 20°.

9. The camera mounting apparatus of claim 7 where the mount end includes a non-slip padding layer.

10. A method of balancing a modular camera support apparatus and attached camera for hands free stability by a user comprising:
- providing an arcuate shoulder brace where the shoulder brace further includes an angled edge to conform to the user's shoulder;
- connecting the shoulder brace to a weight box;
- connecting a first intermediate plate to a front end of the shoulder brace;
- connecting the weight box to a rear end of the shoulder brace;
- connecting a second intermediate plate to the first intermediate plate;
- connecting a camera mount plate to the second intermediate plate;
- mounting the camera to the camera mount plate;
- placing weight in the weight box; and,
- adjusting the connections in a "side-to-side" manner, a "front-to-back" manner, and a rotational manner until the camera is positioned and balanced.

11. A method of balancing a modular camera support apparatus and attached camera for hands free stability by a user comprising:
- providing an arcuate shoulder brace where the shoulder brace further includes an angled edge to conform to the user's shoulder;
- connecting the shoulder brace to a weight box;
- connecting a first intermediate plate to a front end of the shoulder brace;
- connecting the weight box to a rear end of the shoulder brace;
- connecting a camera mount plate to the first intermediate plate;
- mounting the camera to the camera mount plate;
- placing weight in the weight box; and,
- adjusting the connections in a "side-to-side" manner, a "front-to-back" manner, and a rotational manner until the camera is positioned and balanced.

12. A method of balancing a modular camera support apparatus and attached camera for hands free stability by a user comprising:
- providing an arcuate shoulder brace where the shoulder brace further includes an angled edge to conform to the user's shoulder;
- connecting the shoulder brace to a weight box;
- connecting a vertical elevator to the shoulder brace;
- connecting a camera mount plate to the vertical elevator;
- mounting the camera to the camera mount plate;
- placing weight in the weight box; and,
- adjusting the connections in a "side-to-side" manner, a "front-to-back" manner, and a rotational manner until the camera is positioned and balanced.

* * * * *